UNITED STATES PATENT OFFICE.

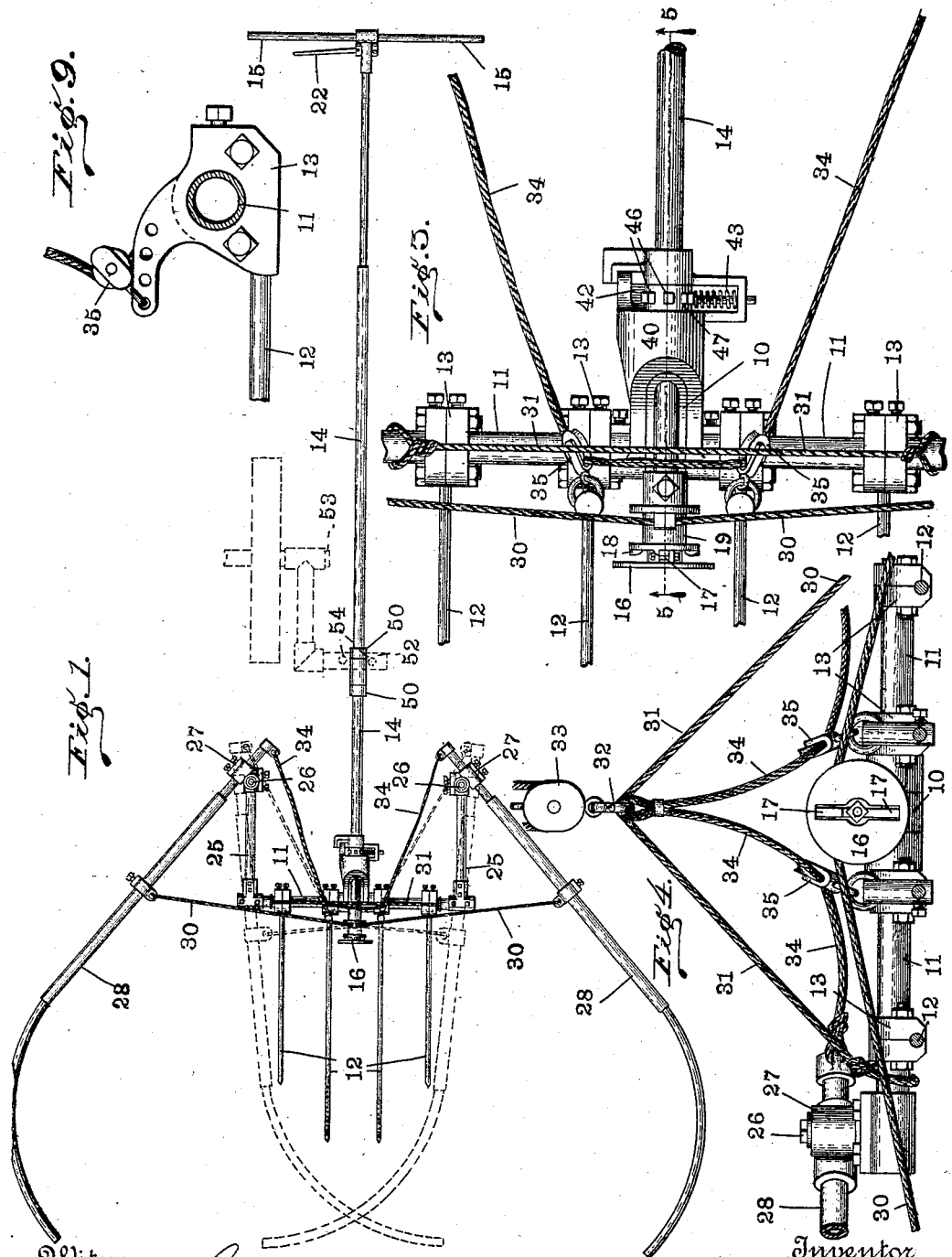

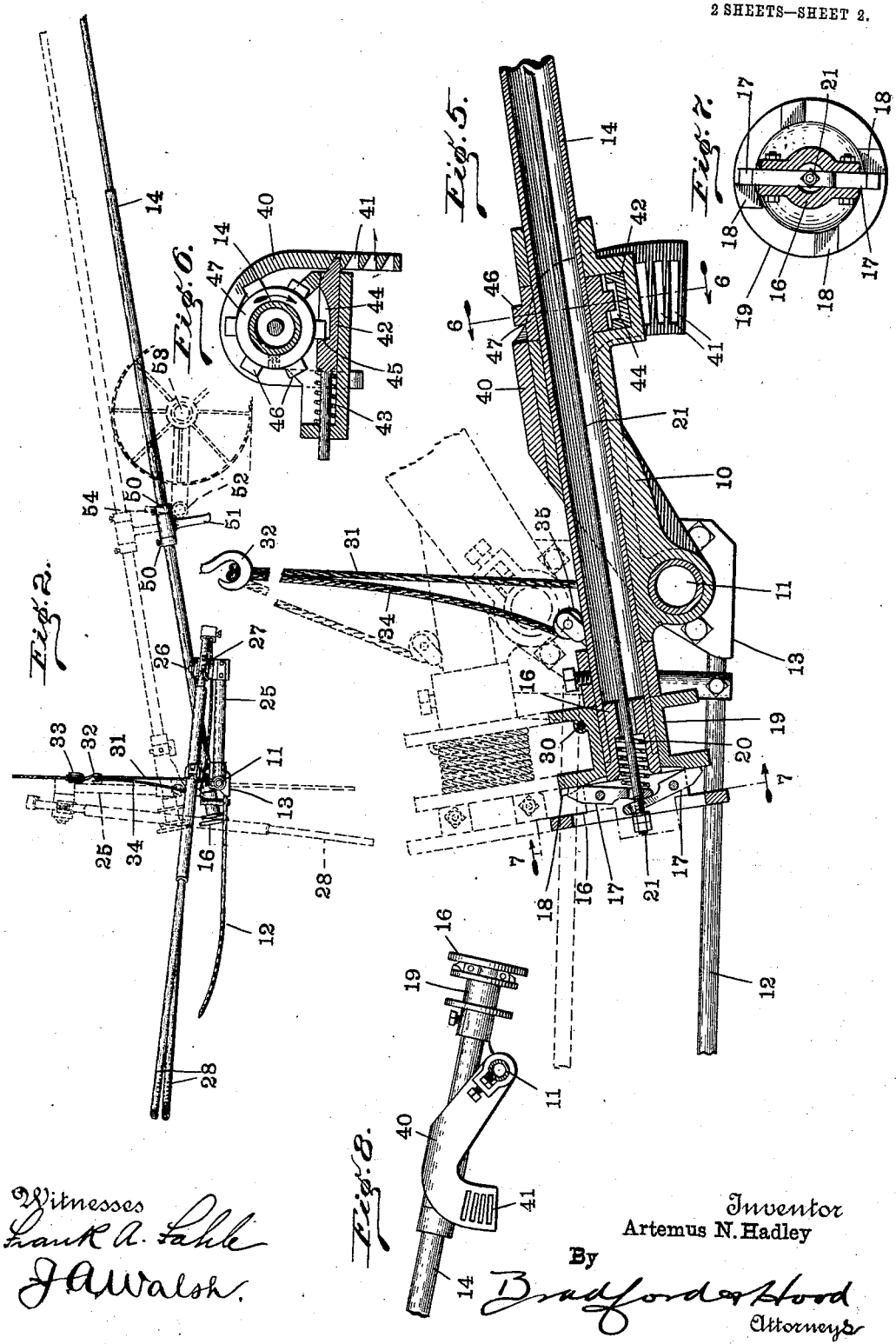

ARTEMUS N. HADLEY, OF INDIANAPOLIS, INDIANA.

SHOCK-LIFTER.

No. 886,123.  Specification of Letters Patent.  Patented April 28, 1908.

Application filed May 29, 1905. Serial No. 262,841.

*To all whom it may concern:*

Be it known that I, ARTEMUS N. HADLEY, a citizen of the United States, residing at Indianapolis, in the county of Marion and State of Indiana, have invented certain new and useful Improvements in Shock-Lifters, of which the following is a specification.

In the handling of a corn crop it is desirable that entire shocks may be lifted bodily from the field to the wagon in order that they may be readily transferred to the shredder.

The object of my present invention is to provide a device by means of which an entire shock may be engaged in such a manner that it may be lifted bodily by any suitable derrick or crane, such for instance, as that shown in my pending application, Serial No. 189,618.

The accompanying drawings illustrate my invention.

Figure 1, is a plan; Fig. 2, a side elevation; Fig. 3, a detailed plan of a portion of the device; Fig. 4, a front elevation of the members shown in Fig. 3; Fig. 5, a section on line 5 5 of Fig. 3; Fig. 6, a section on line 6 6 of Fig. 5; Fig. 7, a section on line 7 7 of Fig. 5; Fig. 8, a detailed side elevation of the side opposite to that shown in Fig. 5, and on a somewhat smaller scale, and Fig. 9, a detail of a modification In the drawings 10, indicates a head in which is journaled a transverse shaft 11 to which is secured a plurality of shock entering teeth 12, each of said teeth being secured to the shaft 11 by means of a suitable clamping head 13.

Journaled in head 10, at right angles to shaft 11, and extending to the rear a suitable distance, is a hollow handle member 14 which, at its rear end, is provided with a transverse handle bar 15. The forward end of the member 14 carries a head 16, within which are pivoted two dogs 17, the outer ends of which are adapted to engage teeth 18 formed upon the forward end of the winding drum 19 journaled on the forward end of the handle member 14. The dogs 17 are normally held in engagement with the teeth 18 by means of a light spring 20, and said dogs may be retracted from engagement with teeth 18 by means of the rod 21 which extends through the adjacent over-lapping ends of the dogs 17 and through the handle member 14 to a point adjacent the handle bar 15 where said rod is attached to the operating lever 22.

Secured to each end of shaft 11 beyond teeth 12, is a rearwardly projecting arm 25, which at its rear end carries an upwardly projecting pin 26 upon which is pivoted a box 27. Passing through and secured to each box 27 is a forwardly extending shock embracing arm 28 which is thus adapted to swing upon the vertical pin 26 and to be rotated about the shaft 11 by reason of the movement of arm 25 therewith. Extending from drum 19 to each arm 28 at a point in front of the pivot pin 26 is a cable 30, by means of which the two arms 28 may be brought toward each other as indicated in dotted lines in Fig. 1.

The weight of the structure is supported primarily by means of a rope 31, the ends of which are attached to shaft 11 near its outer ends, and the bight of which is adapted to be received in the ring 32 of the snatch block 33. The bight of the rope 34 is also attached to the ring 32 and each end of said rope is passed through a snatch-block 35, and from thence to the rear end of one or the other of the arms 28. The snatch-blocks 35 are attached to the shaft 11 at the point in front of its axis, so that any pull upon these blocks will tend to hold the outer ends of the teeth 12 up.

Secured to the shaft 11 with its arms straddling the bearing or head 10 is a yoke 40 which is provided with a down turned portion having a plurality of pawl receiving notches 41 therein, any one of which is adapted to receive the end of the sliding pawl 42 mounted in the body 10 so as to slide transversely with relation to the hollow handle member 14, being normally urged into one of the notches 41 by means of a light spring 43. The pawl 42 has on its upper surface a notch 44 terminating in shoulder 45 adapted to be engaged by any one of a series of lugs 46 carried by a collar 47 secured to the hollow handle member 14, arrangement being such that rotation of the hollow handle member in the direction indicated by the arrow in Fig 6 (which is the direction of rotation necessary for "winding up" the windlass drum so as to bring the arms 28 together) the lugs 46 will pass into notch 44, engage shoulder 45, and retract pawl 42, but reverse rotation of the handle member is prevented by engagement of the adjacent lug 46 with the top of the pawl 42.

In operation the grapple described may be used in connection with any derrick structure, but I prefer to use a wheeled structure, such, for instance, as that shown in my above mentioned pending application which can be used to force the grapple prongs 12 of the grapple into the shock if desired. For this purpose I sleeve upon the hollow handle member 14, between a pair of collars 50, a hanging finger 51 adapted to be engaged by a member 52, shown by dotted lines, carried by the derrick structure 53, said structure being clearly illustrated by means of dotted lines to indicate the adjacent supporting wheel thereof. For convenience, member 52 of the derrick should carry a pair of upright pins 54 between which the handle member 14 may be passed.

In operation the grapple is supported from the snatch-block 33 by a cable 31 and the shock-embracing arms 28 normally are extended as shown in Fig. 1. The shaft 11 is also swung so that the prongs 12 will lie substantially horizontally being held in that position by means of a pawl 42. The prongs 12 are supported a suitable distance from the ground and substantially parallel therewith and by exerting sufficient force upon the structure these prongs may be driven transversely into a shock preferably at a point near the butt. The operator then turns the handle member 14 in the direction indicated by the arrow in Fig. 6 whereupon cables 30 are wound upon the drum 19 and the arms 28 brought together so as to embrace the shock, as indicated in dotted lines in Fig. 1. During this operation the pawl 42 is repeatedly withdrawn from engagement with yoke 40 by the action of successive locks 46 but, as the shock still rests upon the ground there is no tendency to shift the shaft 11 within the head 10. As the arms 28 are drawn together the slight slack in the cables 34 is taken up and the weight of the structure thereupon transferred from cable 31 to cable 34 so that there is a tendency to return the arms 28 to initial or open position, this tendency being resisted, however, by a cable 30 which has been wound upon the drum 19. As soon as a lifting pull is exerted upon the snatch-blocks 33 the entire shock may be lifted and transferred to any desired point of deposit and when this point of deposit is reached the operator turns handle member 14 slightly in the direction indicated by the arrow in Fig. 6 so as to retract pawl 42 from engagement with yoke 40 thus releasing shaft 11 so that it, together with shock embracing arms 28 and the prongs 12, may be turned in the position indicated by dotted lines in Fig. 2. Simultaneously with the withdrawal of the pawl 42, as described, the operator will swing the catch arm 22 so as to withdraw the clutch members 17 from engagement with the drum 19 and, as the weight of the structure together with the shock, is supported by cables 34, said cables operated to automatically swing arms 28 to an open position and the shock is, therefore turned upon its side and dropped off of the prongs 12.

As soon as the weight of the shock is withdrawn from the prongs 12, however, the weight of the cable structure, acting as it does upon cable 34 and through it upon the snatch-blocks 35 which are forward of the axis of shaft 11, automatically swings the prongs 12 upward to normal position.

I claim as my invention;

1. A shock grapple consisting of a main body, a shaft rotatably mounted therein, shock entering prongs carried by said shaft, releasable means for holding said shaft in one position, and a shock embracing means coöperating with said prongs.

2. A shock grapple consisting of a main body, a prong member movably mounted on said main body, releasable means for holding said prong member in one position on said main body, and shock embracing means carried by the prong member.

3. A shock grapple consisting of a main body, a prong-member movably mounted on said main body, releasable means for holding said prong-member in one position on said main body, shock embracing arms carried by the prong-member, means for drawing said shock embracing arms about a shock, and releasable means for holding said arms in embracing position.

4. A shock grapple consisting of a main body, a prong member journaled thereon so as to swing in a substantially vertical plane, a pair of shock embracing arms pivotally mounted on the prong member so as to swing in a substantially horizontal plane, releasable means for holding the prongs of the prong-member in a substantially horizontal plane, means for swinging the embracing arms to embrace a shock, and releasable means for holding said arms in embracing position.

5. A shock grapple consisting of a main body, a shaft journaled therein on a substantially horizontal axis, shock entering prongs carried by said shaft, a pair of shock-embracing arms pivotally mounted upon supports carried by the prong shaft and arranged to swing in a substantially horizontal plane, a windlass carried by the main body, a cable connecting said windlass with the embracing arms to draw said arms to embracing position, a second cable having its ends attached to the shock embracing arms beyond the pivots thereof and its middle arranged to be engaged by means for supporting the entire structure, means for winding said windlass, releasable means for holding said windlass, and releasable means for holding the prongs in a substantially horizontal plane.

6. A shock grapple consisting of a main body, a shaft journaled therein on a substantially horizontal axis, shock entering prongs carried by said shaft, a pair of shock embracing arms pivotally mounted upon supports carried by the prong shaft and arranged to swing in a substantially horizontal plane, a handle member journaled in the main body and extending to the rear, a windlass journaled on the forward end of said handle member, releasable clutch mechanism between said handle member and windlass, a cable attached to said windlass and to the shock embracing arms in front of the pivots thereof, means by which the structure may be suspended, and a cable having its ends attached to the shock embracing arms to the rear of the pivots thereof and extending through portions connected to the prong shaft in front of the axis thereof, and from thence to the supporting means, substantially as and for the purpose set forth.

7. A shock grapple consisting of a main body, a prong shaft journaled therein on a substantially horizontal axis, shock entering prongs carried thereby and extending forward therefrom, a catch mounted upon the main body, means carried by the prong shaft for engagement with said catch, a handle member journaled in the main body and extending to the rear, means carried by said handle member for operating the catch, a windlass journaled on the forward end of the handle member, a separable clutch between said handle member and a windlass, and means extending to the rear of the handle member for operating said clutch.

8. A shock grapple consisting of a main body, a prong shaft journaled therein on a substantially horizontal axis, shock entering prongs carried thereby and extending forward therefrom, a catch mounted upon the main body, means carried by the prong shaft for engagement with said catch, a hollow handle member journaled in the main body and extending to the rear, means carried by said handle member for operating the catch, a windlass journaled on the forward end of the handle member, a separable clutch between said handle member and a windlass, a rod extending to the rear through said hollow handle member and connected at its forward end to said clutch and at its rear end to an operating lever, a pair of arms carried by the prong shaft and extending to the rear, a pair of shock embracing arms pivotally mounted upon said rearwardly extending arms to swing in a plane substantially at right angles to the plane of swing of the prong arms, a cable attached at its ends to the shock embracing arms in front of the pivots thereof, and at its middle attached to the windlass, a second cable attached at its ends to the shock embracing arms to the rear of the pivots thereof, guide blocks 35 through which said last mentioned cable is passed and by which said cable is connected to the prong shaft in front of the axis thereof, and a cable 31, the middle of said cable and the middle of the cable attached to the rear ends of the shock-embracing arms being brought together for a reception in a supporting means.

In witness whereof, I have hereunto set my hand and seal at Indianapolis, Indiana, this 25th day of May, A. D. one thousand nine hundred and five.

ARTEMUS N. HADLEY. [L. S.]

Witnesses:
ARTHUR M. HOOD,
JAMES A. WALSH.